June 9, 1925.
W. L. BELKNAP
VALVE
Filed April 7, 1924
1,541,465
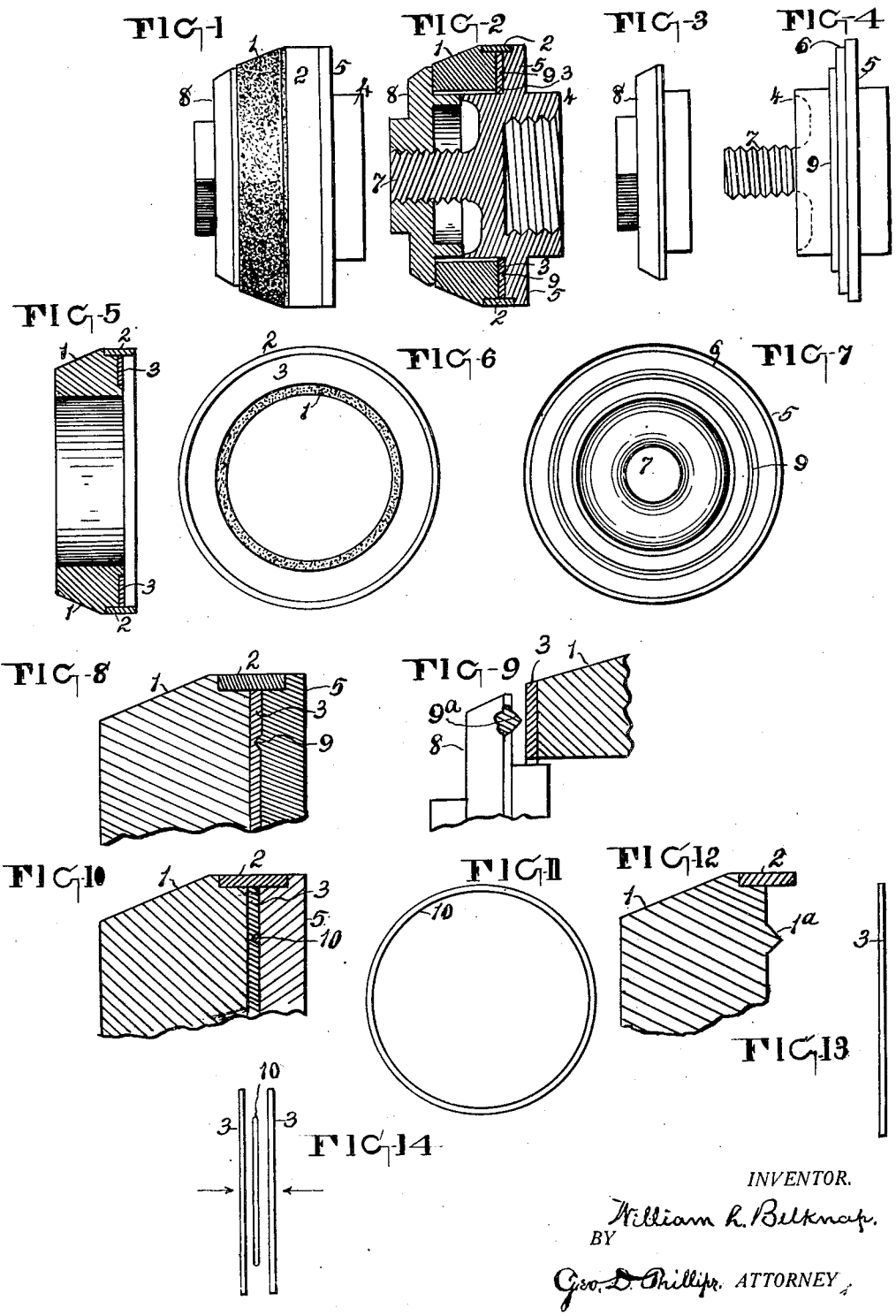
INVENTOR.
William L. Belknap.
BY
Geo. D. Phillips. ATTORNEY Patented June 9, 1925.

1,541,465

UNITED STATES PATENT OFFICE.

WILLIAM L. BELKNAP, OF FAIRFIELD, CONNECTICUT.

VALVE.

Application filed April 7, 1924. Serial No. 704,894.

*To all whom it may concern:*

Be it known that I, WILLIAM L. BELKNAP, citizen of the United States, residing at Fairfield, in the county of Fairfield and State of Connecticut, have invented certain new and useful Improvements in Valves; and I do hereby declare the following to be a full, clear, and exact description of the invention, such as will enable others skilled in the art to which it appertains to make and use the same.

My invention relates to an improvement in valves and devices of like character for effecting a tight joint to prevent leakage of fluids such as oil, air, steam, water &c. A particular feature of my improvement is that in addition to providing a tight valve I also provide a valve disc which can be readily renewed when worn, without any delay or damage to the main parts of the valve.

Valves, as ordinarily made, comprise a metal seat upon which rests a disc. This disc is usually made of molded composition and is inserted in a container commonly known as a disc holder or clapper. This disc is retained in the disc holder by means of a nut usually designated as the "disc nut". With valves of this character no provision has been made, so far as known, to prevent leakage through these three main members, and frequently leakage is experienced where the fluids are cold or of exceptionally low viscosity. Where the fluid is hot a slow partial vulcanizing takes place to such an extent that the disc adheres to the disc holder to such a degree that time and expense are involved in its removal for replacement and not infrequently results in damage to the disc holder or its entire loss.

In my invention I provide a tight valve by sealing the valve disc and its holder by an interposed layer of impressible material located between the holder and valve disc, or between the disc and its nut, or in both joints if desired.

My invention further consists in mounting a metal band on a non-metallic valve disc which may be molded to the disc or afterwards inserted thereon. This band is adapted to prevent expansion of the disc under pressure or heat and it also prevents the disc sticking or adhering to the disc holder.

Referring to the accompanying drawing wherein similar characters of reference indicate corresponding parts throughout the several views.

Figure 1 represents the assembled holder, disc and disc nut;

Figure 2 is a central sectional view of the construction shown at Figure 1;

Figure 3 is a detailed view of the disc nut;

Figure 4 is a detailed view of the disc holder;

Figure 5 is a detailed central sectional view of the valve disc;

Figure 6 is a detail inside view of the valve disc;

Figure 7 is a detail inside view of the disc holder;

Figure 8 is an enlarged broken sectional view of the assembled holder and disc;

Figure 9 is an enlarged broken view partly in section of the valve disc and disc nut;

Figure 10 is an enlarged broken sectional view of the disc holder, valve disc, and an interposed compressible disc, and wire ring to form a tight joint between the valve disc and disc holder;

Figure 11 is an enlarged detail view of a wire ring;

Figure 12 is an enlarged broken sectional view of the valve disc having a beading integral therewith adapted to be impressed into impressible material to form a tight joint;

Figure 13 is an enlarged detail edge elevation of the impressible disc adapted to be engaged by the beading of the valve disc shown in Figure 12, and Figure 14 is a detail view of two impressible discs and an interposed wire ring.

1 represents the valve disc formed of non-metallic and non-porous material impregnable to fluids, gas, air, water or oils, 2 is a metal band mounted on the valve disc overhanging the same and it may be molded to said disc or inserted thereafter, 3 is a thin disc of lead, copper, tin or other impressible substance capable of receiving an indentation from a harder substance, presently to be more fully described.

4, Figure 4, is the metal disc holder having the flange 5 and the reduced portion 6 on which an overhanging part of the metal band 2 is seated when the valve disc 1 and disc holder 4 are assembled as shown in Figure 2, wherein is also shown the threaded stem 7 of the disc holder engaging a threaded hole in the nut 8.

9, Figures 2, 4, 7 and 8, is a circularly arranged beading projecting from the inside face of the disc holder 5 adapted to imbed itself into the adjacent face of the impressible washer shaped disc 3 when the valve disc 1 and the holder 4 are forcibly brought together by the nut 8, thus forming a perfect seal against the escape of the various fluids, gas, air, or oil, particularly the latter, which is one of the most difficult to retain. While the most satisfactory place to effect this sealing feature is between the valve disc 1 and its holder 4, the beading 9ª, Figure 9, could be formed on the inner face of the nut 8, and the impressible disc 3 placed between the nut and valve disc.

The beading 1ª, Figure 12, could form an integral part of the valve disc if so desired, or the wire ring 10, Figures 10, 11, and 14, could be substituted for the integral beading shown in the other views. In Figure 14 this wire ring is located between two impressible discs to be imbedded therein by pressure applied in the direction of the arrows.

The essential element in making an absolute tight joint is the interposed disc 3 of lead, tin, copper, or any material capable of receiving a sealing impression from a harder material, and that will withstand heat, or the corrosive effect of the various fluids that may pass through the valve. The valve disc is composed of material too hard to be impressed by the raised beading on the disc holder or nut, therefore it is essential to interpose a softer material that will take a suitable impression in order to make a perfect seal. This impressible disc may, if desired, be molded into the valve disc 1, or remain a separate element to be thereafter interposed.

The metal band 2, as before mentioned, is of less length than the thickness of the valve disc 1 and serves to retain the proper shape of said valve disc, and in connection with the interposed disc 3, effectually prevents the valve disc adhering to the disc holder. When necessary to replace a worn valve disc, a new valve disc equipped with a similar band can instantly be inserted. If the metal band is molded to the valve disc the whole can be thrown away, as this thin metal band is of little value as compared with the heavy disc holder. If not molded to the valve disc, even this insignificant piece of metal could be saved. The readily interchangeable feature of the valve disc is primarily due to this metal band.

It will be understood that a plurality of indentations could be made in the member 3, if desired.

Having thus described my invention what I claim is:—

1. In a valve construction of the character described, a non-metallic valve disc member, an abutting metal member, and an interposed member of softer material than the disc and metal member and means for indenting said interposed member to effect a tight joint between the metal member and the valve disc member.

2. In a valve construction of the character described, a non-metallic and non-porous valve disc member, an abutting metal member, an interposed member of impressible material, said metal member having circumferentially arranged beading for forming an indentation in said interposed member to effect a tight joint.

3. In a valve construction of the character described, comprising a non-metallic valve disc, a metal band mounted on the valve disc and overhanging the same, a metal disc holder having a supporting seat for the overhanging portion of the valve disc, and an interposed member of softer material than the valve disc or its holder adapted to be forcibly indented by a circumferentially arranged beading to seal the valve against the escape of fluids when the valve is closed.

4. A valve construction comprising a non-metallic and non-porous valve disc, a metal band mounted on a part of said disc and overhanging the same, a metal disc holder having a supporting seat for said overhanging portion of the band, an interposed compressible member, and means to form an indentation in said member to seal the valve against the escape of fluids when the valve is closed.

5. A valve construction of the character described, comprising a non-metallic and non-porous valve disc, a metal disc holder having a threaded stem, an interposed impressible member, means adapted to indent said member, and a nut mounted on the stem of the holder to force the valve disc and holder firmly against said interposed member to indent the same and seal the valve against escape of fluids when the valve is closed.

6. A non-metallic valve disc, a metal band of less length than the thickness of the valve disc mounted thereon and overhanging the same, a metal disc holder supporting such overhanging portion of the band, and a disc member located between the valve disc and its holder, said disc member and metal band preventing the valve disc adhering to its holder.

In testimony whereof I affix my signature.

WILLIAM L. BELKNAP.